United States Patent [19]

MacDonald

[11] Patent Number: 6,070,513

[45] Date of Patent: Jun. 6, 2000

[54] LOAD TRANSFER DEVICE FOR TANDEM MOUNTED ACTUATORS

[75] Inventor: Daniel L. MacDonald, Long Lake, Minn.

[73] Assignee: Honeywell Inc., Minneapolis, Minn.

[21] Appl. No.: 09/234,215

[22] Filed: Jan. 20, 1999

[51] Int. Cl.[7] ............................................. F01B 15/00
[52] U.S. Cl. .......................... 91/176; 91/186; 91/188; 92/136; 92/137; 60/483
[58] Field of Search ................. 91/170 R, 176, 91/181, 186, 188; 92/136, 137; 60/483

[56] References Cited

U.S. PATENT DOCUMENTS

| | | |
|---|---|---|
| 3,186,731 | 6/1965 | Fossard . |
| 3,263,572 | 8/1966 | Sunderland ................................. 91/176 |
| 3,833,236 | 9/1974 | Davis et al. . |
| 4,187,763 | 2/1980 | Nanda ......................................... 91/176 |
| 4,420,171 | 12/1983 | Raidel . |
| 4,526,086 | 7/1985 | Holton et al. ........................... 91/176 X |
| 4,658,703 | 4/1987 | Greene ..................................... 91/176 X |
| 4,702,147 | 10/1987 | Johnson et al. ......................... 92/137 X |
| 4,733,558 | 3/1988 | Grenier . |
| 4,748,392 | 5/1988 | Goicoechea ............................ 91/176 X |
| 4,825,748 | 5/1989 | Sheng . |
| 5,426,353 | 6/1995 | Stuhr et al. . |

*Primary Examiner*—Hoang Nguyen
*Attorney, Agent, or Firm*—Charles L. Rubow

[57] ABSTRACT

A load transfer device for use with tandem mounted actuators. The load transfer device includes an actuator coupling assembly and a ground connection assembly. The actuator coupling assembly connects the first actuator to the second actuator and includes a movement apparatus. The movement apparatus is configured to allow the housing of the first actuator to move relative to the housing of the second actuator. The ground connection assembly is associated with the actuator coupling assembly and movably connects the first and second actuators to a rigid support structure. During a load transfer operation, the actuator coupling assembly transfers an unequal load from the first actuator to the second actuator. In particular, the movement apparatus allows the first actuator to move relative to the second actuator. Further, the actuator coupling assembly is configured to transpose movement of the first actuator into a forced, reciprocal movement of the second actuator.

7 Claims, 7 Drawing Sheets

LOAD TRANSFER DEVICE FOR TANDEM MOUNTED ACTUATORS

BACKGROUND OF THE INVENTION

The present invention relates to dual rotary actuator drive systems, and more particularly to a load transfer arrangement for balancing loads on tandem actuators connected to a common shaft.

Electromechanical actuators, and in particular direct coupled actuators which have come into increasingly common use, have a wide variety of applications. Generally speaking, actuators receive a control signal and mechanically reposition a final control element in response to that control signal. For example, in the heating, ventilating and air conditioning (HVAC) industry, actuators are commonly used to control positioning of dampers and valves in response to a signaling device, such as a thermostat. These dampers or valves, in turn, may be used to control building fluid or air flow, roof top exhaust fans, supply fans, variable air volume equipment, internal exhaust systems, cooling towers, combustion air inlets for boilers or furnace rooms, steam, hot water or chilled water lines, to name but a few.

Regardless of the specific application, the damper or valve generally includes a control shaft, the movement of which dictates a position of the damper or valve. For example, rotation of the control shaft will cause the damper to move between an open position and a closed position. Conventional actuator systems typically employ some form of linkage arrangement between the actuator output and load control shafts. Direct coupled actuators typically have an output hub which is mated directly with the damper or valve control shaft, eliminating the need for an auxiliary linkage assembly.

Mechanical stops are normally provided to limit rotation of the drive hub to a desired range. The mechanical stops, as well as the drive motor, are contained in a housing. In a typical installation, the actuator housing is mounted to a rigid support structure associated with the damper or valve being controlled. For example, the actuator housing may be mounted to duct work extending from the damper or valve in question. The fixed actuator housing provides a reaction structure for the moment load seen by the drive hub.

Most commercial damper and/or valve applications requirements can be met by one of several "standard" actuator sizes. As a result, actuator manufacturers typically produce actuator models having a limited number of torque outputs or "ratings". For example, commonly available actuators include 25 lb-in (3N-m), 50 lb-in (6N-m), 142 lb-in (16N-m), 150 lb-in (17N-m) and 300 lb-in (34N-m)

While a 300 lb-in (34N-m) actuator is sufficient to control most commercial dampers and valves, certain applications will invariably require a greater actuator torque rating. For example, a large cooling tower may necessitate a uniquely sized damper having increased output shaft torque requirements for maneuvering between an open and closed position. Because these types of applications are relatively uncommon, actuator manufacturers cannot provide actuators having a torque rating greater than 300 lb-in (34N-m) on a cost-effective basis. As a result, for dampers and/or valves requiring an output shaft torque of greater than 300 lb-in (34N-m), two (or more) of the available actuators are coupled to the output shaft.

In theory, mounting two actuators (or "tandem mount") to a single output shaft will result in the necessary torque being applied to the output shaft. Unfortunately, however, certain complications may arise. For example, during installation of direct coupled actuators, it is virtually impossible to mount the drives of both actuators to the output shaft at precisely the same rotational position. As a result, the mechanical stops associated with each actuator are not aligned. During use, then, a first one of the actuator drives will reach its mechanical stop before the second actuator drive. At this point, the mechanical stop associated with the first actuator resists further rotational movement of the first actuator drive. The second actuator continues to drive towards its mechanical stop. Effectively then, the two actuators are driving into the first actuator's mechanical stop, resulting in dramatic actuator drive wear. A similar problem may arise as a result of certain inherent inconsistencies in the electrical and gear train characteristics of the two actuators. These internal inconsistencies may cause one actuator to initiate an output shaft torque operation before the other. In this instance, the first actuator drive will reach its mechanical end point ahead of the second actuator. The first actuator's mechanical stop will resist any further movements. Once again, the second actuator will attempt to continue rotational driving of the output shaft until its determined stop point is reached. The two actuators are effectively both driving against the mechanical stop of the first actuator resulting in actuator wear and premature failure. This problem is compounded where the output shaft itself applies a load against the mechanical stop. Finally, the internal inconsistencies (and resulting non-linear operation) may result in the tandem mounted actuators "fighting" one another throughout a torque application operation.

Commercial damper and valve control actuators, and in particular direct coupled actuators, continue to be extremely popular control devices. However, due to the generally standard sizes of actuators currently available, the torque requirements of certain applications cannot be met by a single actuator. In these cases, a tandem mounted actuator approach is normally used, leading to potential concerns. Therefore, a substantial need exists for an apparatus and method for facilitating proper operation of tandem mounted actuators.

SUMMARY OF THE INVENTION

One aspect of the present invention provides a load transfer device for connecting a first actuator to a second actuator. Each of the actuators includes a drive mounted within a housing, each drive being connectable to an output shaft of a device to be controlled by the actuators (such as a commercial damper or valve). Each of the actuators is configured such that upon activation, the respective drive imparts a moment load on the output shaft and a reciprocal, opposing moment load on the respective housing. The load transfer device includes an actuator coupling assembly and a ground connection assembly. The actuator coupling assembly connects the first actuator housing to the second actuator housing and is configured to transfer a moment load on the first actuator housing to the second actuator housing during a load transfer operation. To this end, the actuator coupling assembly includes a movement means configured to allow the first actuator housing to move relative to the second actuator housing during the load transfer operation. The ground connection assembly is associated with the actuator coupling assembly to movably connect the first and second actuator housings to a rigid support structure.

Another aspect of the present invention relates to a method for tandem mounting a first and a second actuator to an output shaft of a device to be controlled by the actuators, such as a commercial damper or valve. Each of the actuators includes a drive and a housing, the housing being attached to the respective drive such that a resistance to movement of the drive is transferred to the housing as a moment load. The method includes connecting the first actuator drive to the output shaft. The second actuator drive is then connected to the output shaft, spaced from the first actuator. The first actuator housing is coupled to the second actuator housing such that at least a portion of a moment load on the first actuator housing can be transferred to the second actuator housing. In this regard, the coupling of the first actuator housing to the second actuator housing allows the first actuator housing to move relative to the second actuator housing.

Yet another aspect of the present invention relates to an apparatus for controlling movement of an output shaft of a damper. The apparatus includes a first actuator, a second actuator and a load transfer assembly. The first and second actuators each have a drive and a housing. The drive of each actuator is connectable to the output shaft for imparting a moment load thereon. Further, the housing of each actuator is secured to the respective drive such that an opposing moment load is placed on the housing in response to the moment load imparted on the output shaft. The load transfer device includes an actuator coupling assembly and a ground connection assembly. The actuator coupling assembly connects the first actuator housing to the second actuator housing and includes a movement means configured to allow the first actuator housing to move relative to the second actuator housing. With this configuration, the actuator coupling assembly transfers at least a portion of a moment load on the first actuator housing to the second actuator housing during a load transfer operation. The ground connection assembly is associated with the actuator coupling assembly for movably connecting the first and second actuator housings to a rigid support structure.

DETAILED DESCRIPTION OF THE PREFERRED EMBODIMENTS

Figure 1:
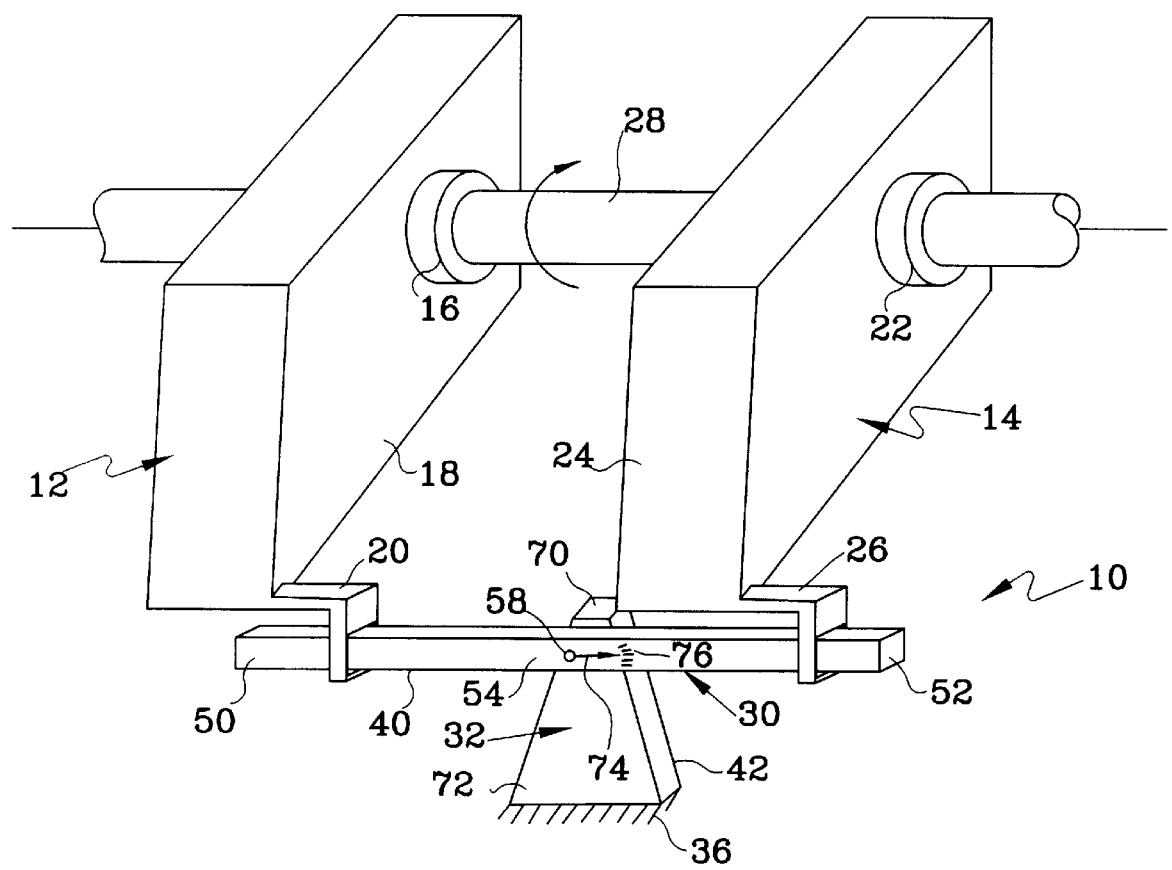
FIG. 1 is a perspective view of a load transferring device coupling tandem mounted actuators in accordance with the present invention.

One preferred embodiment of a load transfer device 10 is shown in FIG. 1. Load transfer device 10 is shown in FIG. 1 as coupling a first actuator 12 and a second actuator 14. First actuator 12 is shown in block form in FIG. 1 and generally includes a drive hub 16 (a portion of which is shown in FIG. 1) and a housing 18. A tab 20 extends from housing 18. Similarly, second actuator 14 includes a drive hub 22 and a housing 24 from which a tab 26 extends. First and second actuators 12, 14 are shown as being mounted to an output shaft 28 in a spaced fashion. Output shaft 28 may be an integral portion of a device to be controlled by first and second actuators 12, 14, such as a commercial damper or valve (not shown). More particularly, drive hubs 16, 22 are mounted to output shaft 28 so as to impart a moment load on output shaft 28. The moment load generated by drive hubs 16, 22 may be either clockwise or counterclockwise depending upon the desired direction of rotation of output shaft 28. Each of first and second actuators 12, 14 is configured such that the moment load generated by respective drive hubs 16, 22 imparts an opposite moment load on respective housings 18, 24. Thus, for example, where drive hub 16 of first actuator 12 is signaled to impart a 300 lb-in (34N-m) moment load on output shaft 28, unless first actuator housing 18 is restrained, housing 18 will rotate about drive hub 16. Where first actuator housing 18 is secured to a ground structure, however, drive hub 16 imparts the requisite moment load on output shaft 28.

Load transfer device 10 is comprised of an actuator coupling assembly 30 and a ground connection assembly 32. Actuator coupling assembly 30 connects first actuator 12 to second actuator 14 and includes a pivotable beam 40. Ground connection assembly 32 is associated with actuator coupling assembly 30 and is secured to a rigid support structure 36 (shown generally in FIG. 1). Rigid support structure 36 serves as a ground for load transfer device 10 and may assume a wide variety of forms including duct work, storage tanks facility structural beams, etc. Components of load transfer device 10 are described in greater detail below. Generally speaking, however, actuator coupling assembly 30 is configured to transfer a moment load on housing 18 of first actuator 12 to housing 24 of second actuator 14, and vice-versa. To this end, first actuator housing 18 is rendered movable relative to second actuator housing 24 via pivotable beam 40. Ground connection assembly 32 associates each housing 18, 24 with rigid support structure 36 to provide requisite resistance to a moment load generated by respective drives 16, 22, yet allow first actuator housing 18 to move relative to second actuator housing 24.

In the embodiment shown in FIG. 1, actuator coupling assembly 30 includes a beam 40. Ground connection assembly 32 includes an anchor 42. Upon final assembly, load transfer device 10 is constructed such that tab 20 of first actuator 12 is slidably associated with an end of beam 40. Similarly, tab 26 of second actuator 14 is slidably associated with an opposite end of beam 40. Movement means is created by pivotally securing beam 40 to anchor 42 between first and second actuators 12, 14. Finally, anchor 42 is secured to rigid support structure 36.

Beam 40 is preferably an integral body made of steel, but any other type of rigid material may be used. In general terms, beam 40 is comprised of a first end 50, a second end 52 and a central portion 54. First end 50 is preferably configured to slidably receive tab 20 of first actuator 12; whereas second end 52 is preferably configured to slidably receive tab 26 of second actuator 14. Finally, central portion 54 is preferably configured for rotatable attachment to anchor 42. With these requirements in mind, beam 40 is shown in FIG. 1 as being a straight bar having a length slightly greater than a distance between tabs 20, 26. Central portion 54 includes a passage 56 for receiving a pin 58 otherwise securable to anchor 42.

Figure 2:
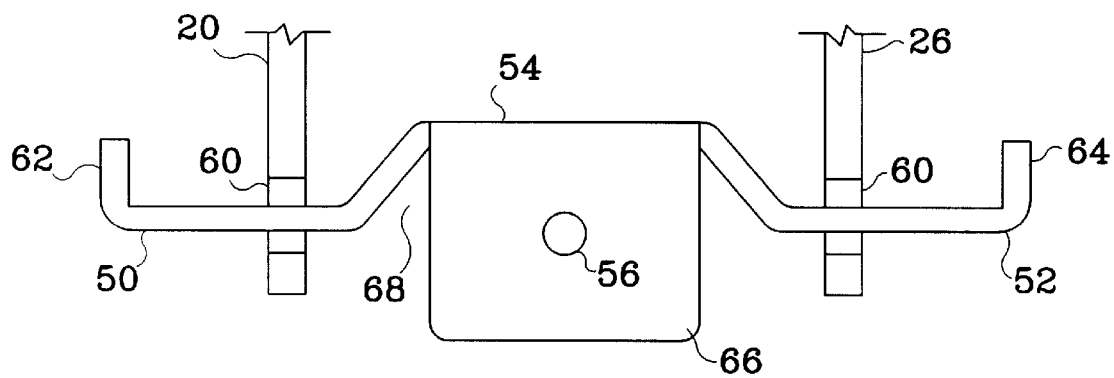
FIG. 2 is a front view of a portion of the load transfer device of FIG. 1.

One preferred embodiment of beam 40 is shown in greater detail in FIG. 2. As a point of reference, beam 40 is shown in FIG. 2 separate from anchor 42 (FIG. 1) and connected to tabs 20, 26. In this regard, first end 50 and second end 52 each have a thickness less than a diameter of a slot 60 formed in each of tabs 20, 26. Further, first end 50 terminates in a flange 62. Similarly, second end 52 terminates in a flange 64. With this configuration, tabs 20, 26 can slide along first end 50 and second end 52, respectively. However, flange 62 and flange 64 prevents tab 20 and tab 26, respectively, from disengaging beam 40. Central portion 54 extends between first end 50 and second end 52, and includes an attachment plate 66 that forms passage 56. As shown in FIG. 2, central portion 54 bends relative to first and second ends 50, 52. Further, attachment plate 66 extends away from first and second ends 50, 52, thereby creating a receiving area 68. As described in greater detail below, receiving area 68 is sized in accordance with a portion of anchor 42 (FIG. 1).

Returning to FIG. 1, anchor 42 is preferably an integral block of rigid material, such as steel, although other materials are acceptable. Anchor 42 is defined by an upper portion 70 and a lower portion 72. Although hidden in FIG. 1, upper portion 70 is configured to receive pin 58. Lower portion 72 is configured for attachment to rigid support structure 36, such as by rivets, welds, adhesive, etc. In this regard, lower portion 72 may include extensions sized to facilitate attachment to rigid support structure 36. First and second actuators 12, 14 are mounted to output shaft 28 at any spacing required by a particular application. Beam 40 is sized according to the required actuator spacing.

To facilitate proper alignment during assembly, load transfer device 10 may include a pointer 74 and leveling indicia 76. Pointer 74 is secured to and extends from pin 58. Leveling indicia 76 are formed on central portion 54 of beam 40. By positioning beam 40 such pointer 74 is centered on leveling indicia 76, a user can visually confirm whether beam 40, and thus tabs 20, 26, is level relative to anchor 42. It should be understood that pointer 74 and leveling indicia 76 are not necessary elements of load transfer device 10.

During use, load transfer device 10 functions to balance loads placed upon first and second actuators 12, 14. For example, first and second actuators 12, 14 may be signaled by an external controller (not shown) to rotate output shaft 28. As previously described, output shaft 28 may be connected to a commercial damper or valve (not shown). As shown by arrows in FIG. 1, first and second actuators 12, 14 are signaled to rotate output shaft 28 in a clockwise direction. In response to this signaling, drive hubs 16, 22 operate to impart a clockwise torque onto output shaft 28. Because actuator housings 18, 24 are connected to drive hubs 16, 22, respectively, an opposing, counterclockwise torque is similarly placed onto actuator housings 18, 24, and thus upon tabs 20, 26. With reference to the operation illustrated in FIG. 1, the ends of both actuator housings 18, 24 remote from shaft 28 are biased downwardly. Tabs 20, 26, however, are connected to beam 40, which in turn is connected to anchor 42. Further, tab 20 of first actuator 12 is connected to beam 40 at a point opposite tab 26 of second actuator 14 relative to pin 58. Finally, anchor 42 is connected to rigid support structure 36. With this configuration, then, load transfer device 10 provides a static resistance to counterclockwise (or downward) movement of actuator housings 18, 24 such that the desired clockwise torque is applied to output shaft 28.

Figure 3:
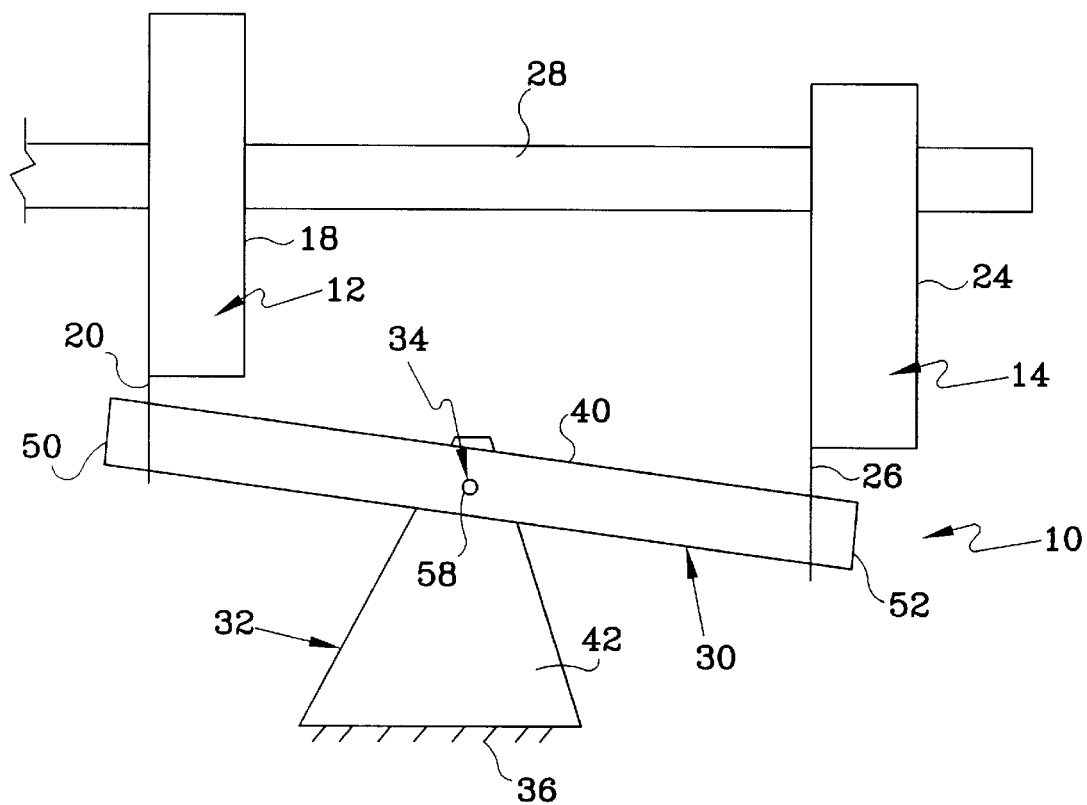
FIG. 3 is a block diagram of the load transfer device of FIG. 1 following a load transfer operation.

At a certain point during the torque operation, the moment load generated by drive 16 of first actuator 12 may be in opposition to the moment load generated by drive 22 of second actuator 14. Alternatively, first actuator 12 may stop movement while second actuator 14 continues to drive or vice-versa. With reference to the above example, first actuator 12 may reach a mechanical stop point before second actuator 14. At this point, first actuator 12 will no longer operate to rotate shaft 28, and resists further rotation of the shaft. However, second actuator 14 continues to apply a clockwise torque onto output shaft 28. Where first and second actuators 12, 14 are rated for a 300 lb-in torque output, first actuator 12, at the stop point, applies a 300-pound load onto output shaft 28 in a clockwise direction. Also, second actuator 14 continues to apply a 300-pound load in a clockwise direction. If load transfer device 10 were not included, first actuator 12 would experience a 600-pound load, leading to excessive stress and premature wear. Load transfer device 10, however, operates to eliminate this problem by allowing the actuators to rotate about shaft 28 relative to one another, as illustrated in FIG. 3, to equalize the loading experienced by the actuators.

Figure 4:
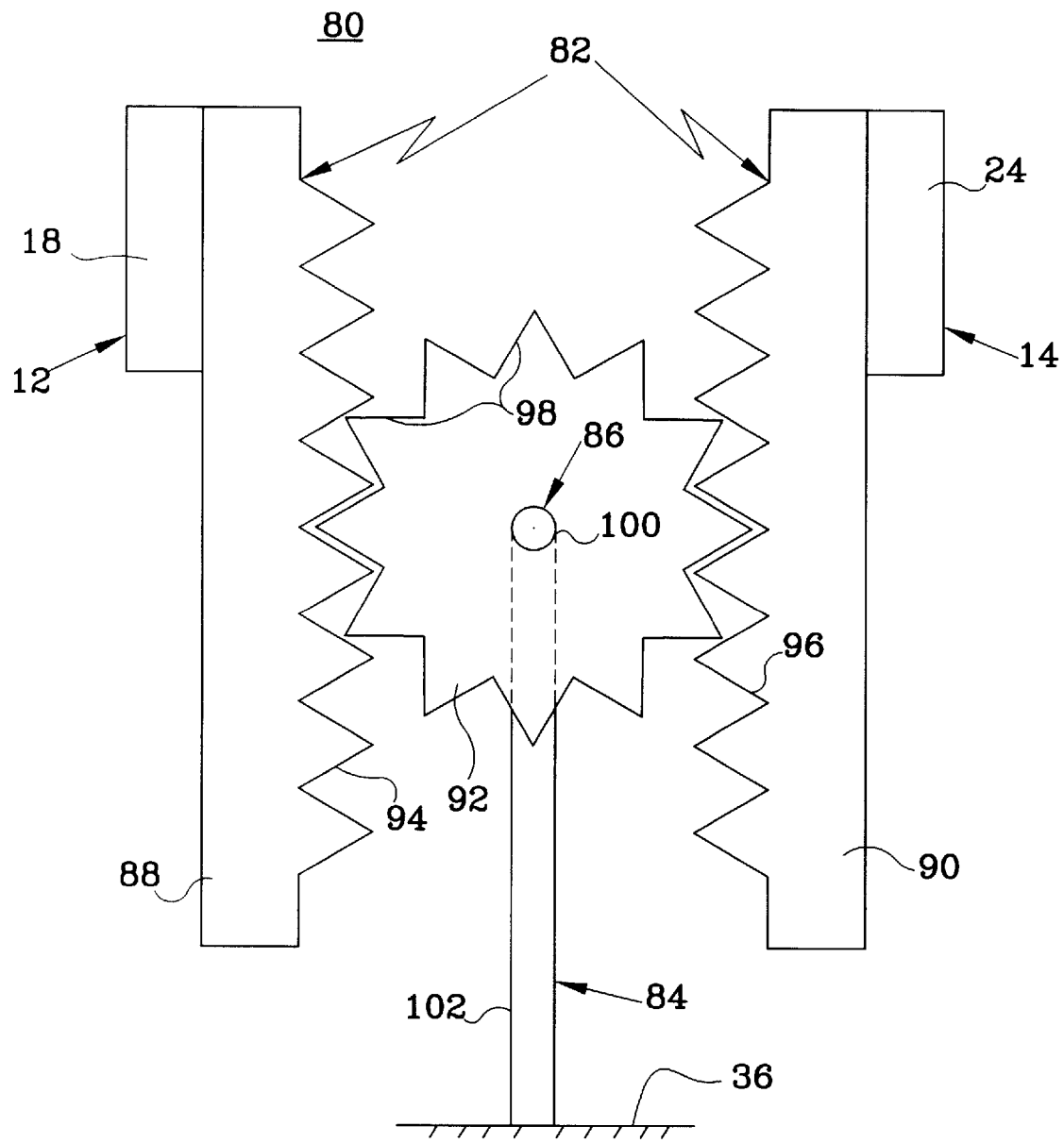
FIG. 4 is a block diagram of a first alternative load transfer device in accordance with the present invention.

It should be recognized that load transfer device 10 can assume a wide variety of forms other than beam 40 and anchor 42 shown in FIG. 1. For example, an alternative embodiment of a load transfer device 80 in accordance with the present invention is shown in FIG. 4. Load transfer device 80 connects first actuator 12, second actuator 14 and rigid support structure 36. For purposes of illustration, first and second actuators 12, 14 are shown in block form.

Similar to load transfer device 10 (FIG. 1), load transfer device 80 includes an actuator coupling assembly 82, a ground connection assembly 84 and a movement means 86. Actuator coupling assembly 82 connects first actuator 12 to second actuator 14. Ground connection assembly 84 connects actuator coupling assembly 82, and thus first actuator 12 and second actuator 14, to rigid support structure 36. Finally, first actuator 12 is movable relative to second actuator 14 via movement means 86.

In the embodiment of FIG. 4, actuator coupling assembly 82 includes a first rack 88, a second rack 90 and a pinion 92. First rack 88 and second rack 90 are virtually identical, made of a rigid material such as steel, although other materials are equally acceptable. Further, first rack 88 and second rack 90 have a virtually identical thickness. First rack 88 forms a toothed surface 94; second rack 90 forms a toothed surface 96.

Pinion 92 is preferably an integral body formed of a rigid material such as steel, although other materials are acceptable. Teeth 98 are formed at an outer circumference of pinion 92. Teeth 98 are formed to engage toothed surfaces 94, 96 of first and second racks 88, 90, respectively, in a meshing fashion. Finally, pinion 92 is rotatable about a pin 100.

Ground connection assembly 84 is preferably a rod 102 configured to extend from pinion 92 to rigid support structure 36. In this regard, rod 102 may be an extension of pin 100. Regardless of exact construction, however, the association of pinion 92 with rod 102 is such that pinion 92 is rotatable about pin 100. With this configuration, movement means 86 is formed by the rotatable association of pinion 92 about pin 100 and/or rod 102.

Assembly of load transfer device 80 includes first securing first actuator 12, and in particular first actuator housing 18 to first rack 88. Connection of first actuator 12 to first rack 88 can be achieved in a wide variety of fashions, including welding, bolting, adhesive, etc. Similarly, second rack 90 is secured to second actuator housing 24. Notably, first and second racks 88, 90 can be secured to first and second actuators 12, 14, respectively either before or after mounting of first and second actuators 12, 14 to output shaft 28 (FIG. 1).

Pinion 92 is then associated with first and second racks 88, 90. In particular, pinion 92 is centered between first rack 88 and second rack 90 such that teeth 98 mesh with toothed surfaces 94, 96. In one preferred embodiment, diameter of pinion 92 is predetermined such that first and second actuators 12, 14 are mounted to output shaft 28 (FIG. 1) so that first and second racks 88, 90 are spaced in accordance with a diameter of pinion 92. Alternatively, a number of differently sized pinions 92 can be provided. Under these circumstances, a properly sized pinion 92 is selected based upon the resulting spacing between first and second racks 88, 90. Pinion 92 is then secured to rigid support structure 36 via rod 102. As previously described, rod 102 may include pin 100, or pin 100 may be a separate component secured to rod 102. In either case, pinion 92 is rotatable about pin 100. Finally, a connection bar or other means (not shown) is pivotably secured to first rack 88 and second rack 90. Connection bar or other means is configured to prevent first and second racks 88, 90 from disengaging pinion 92, while allowing first rack 88 to move relative to second rack 90, and vice-versa, upon rotation of pinion 92.

During use, first and second actuators 12, 14 are connected to rigid support structure 36 via actuator coupling assembly 82 and ground connection assembly 84 so that a rigid resistance is provided to actuator housings 18, 24 during normal operations. When moment loads produced by first actuator 12 and second actuator 14 become offset or unequal, actuator coupling assembly 82 performs a load transfer operation whereby a load on first actuator is transferred 12 is transferred to second actuator 14 or vice-versa. For example, first actuator 12 may reach a mechanical stop point before second actuator 14. Under these circumstances, second actuator 14 continues to apply a moment load to output shaft 28 (FIG. 1), whereas first actuator 12 resists further movement. Actuator coupling assembly 82 allows first actuator 12 to move in conjunction with output shaft 28, while transferring a load on first actuator 12 to second actuator 14. For example, after reaching a mechanical stop, first actuator 12 will rotate with further rotation of output shaft 28 such that first actuator housing 18 moves upward (relative to orientation of FIG. 4). Upward movement of first actuator housing 18 is transposed through rack 88 and pinion 92 into a downward movement of rack 90, and thus of second actuator housing 24, due to rotation of pinion 92 about pin 100. Effectively, then, the torque generated by second actuator 14, otherwise acting on first actuator 12 via output shaft 28, is equally shared by first and second actuator housings 18, 24 as first actuator housing 18 moves relative to second actuator housing 24, in a reciprocal fashion.

Figure 5:
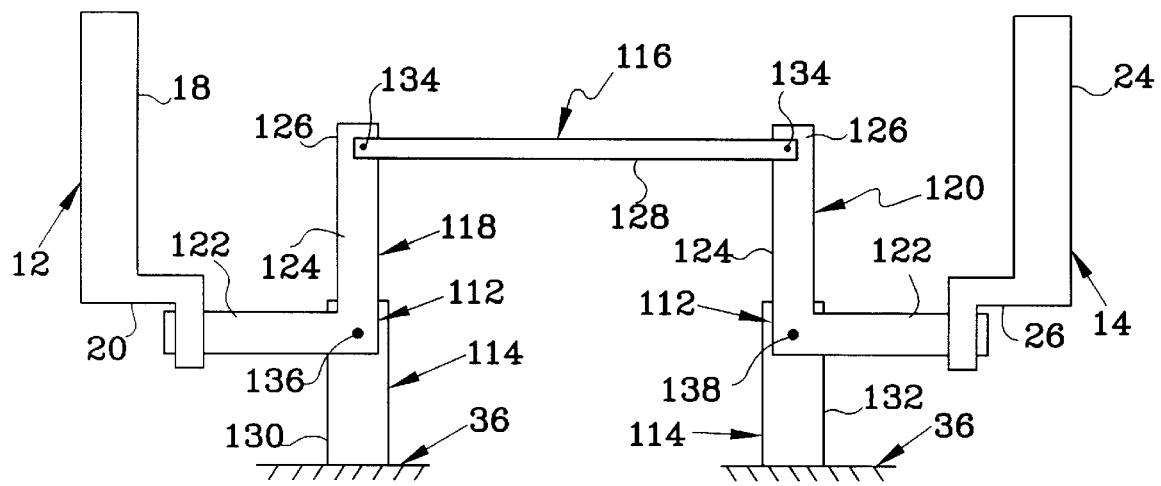
FIG. 5 is a block diagram of a second alternative load transfer device in accordance with the present invention.

Yet another alternative embodiment of a load transfer device 110 is shown in FIG. 5. Load transfer device 110 includes an actuator coupling assembly 112 and a ground connection assembly 114. Actuator coupling assembly 112 includes a movement means 116 and connects first actuator 12 to second actuator 14 (shown in block form). Movement means 116 is configured to allow first actuator 12 to move relative to second actuator 14. Finally, ground connection assembly 114 connects actuator coupling assembly 112, and thus first and second actuators 12, 14, to rigid support structure 36.

In the embodiment of FIG. 5, actuator coupling assembly 112 includes a first bell crank 118 and a second bell crank 120. Each of first and second bell cranks 118, 120 includes an actuator connection end 122, a central portion 124 and a beam connection end 126. Movement means 116 is preferably a linkage member 128. In the illustrated embodiment, linkage member 128 is an integral rod. Alternatively, linkage member 128 may be a plurality of interconnected rod components. As is apparent, linkage member 128 may have any length, thereby permitting the actuators to be separated by any distance required in a given application.

Finally, ground connection assembly 114 includes a first anchor 130 and a second anchor 132. First and second anchors 130, 132 are virtually identical, preferably being a block of solid material, and are configured to pivotably receive first and second bell cranks 118, 120, respectively.

During use, as first and second actuators 12, 14 apply a similar load to output shaft 28 (FIG. 1) connection of actuator coupling assembly 112 to rigid support structure 36, via ground connection assembly 114, provides sufficient resistance to first and second actuator housings 18, 24. When moment load produced by first actuator 12 differs from that of second actuator 14, load transfer device 110 performs a load transfer operation. As with previous embodiments, during a load transfer operation, load transfer device 110 essentially balances the moment loads produced by first and second actuators 12, 14. Where, for example, second actuator 14 has reached a mechanical stop point and first actuator 12 continues to apply moment load on output shaft 28 (not shown), resulting moment load placed on second actuator 14 (via movement of output shaft 28), causing second actuator housing 24 to move upwardly (relative to the orientation of FIG. 5) for example. This movement is transferred as a moment load onto second bell crank 120. In response, second bell crank 120 pivots at central portion 124, thereby imparting a force onto linkage arm 128 via beam connection end 126. For example, second bell crank 120 may force beam 128 leftward (relative to the orientation of FIG. 5). This force is in turn imparted onto first bell crank 118 and thus onto first actuator housing 18. For example, in response to a leftward movement of linkage arm 128, first actuator housing 18 will move downwardly. Thus, first actuator 12 and second actuator 14 move in opposite directions, thereby balancing the moment load placed on second actuator 14 by continued torque of first actuator 12.

Figure 6:
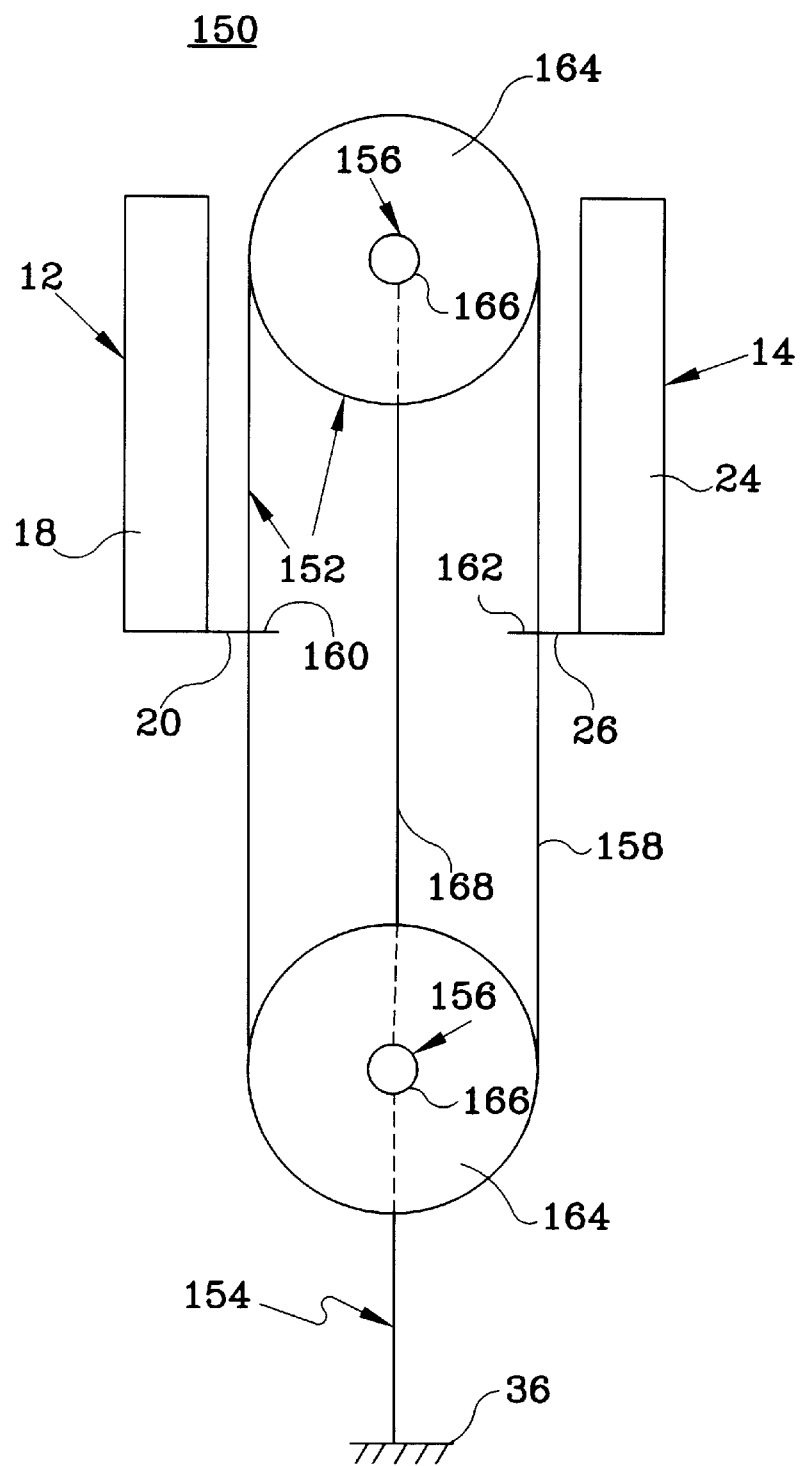
FIG. 6 is a block diagram of a third alternative load transfer device in accordance with the present invention.

Yet another alternative embodiment of a load transfer device 150 is shown in FIG. 6. As with previous embodiments, load transfer device 150 includes an actuator coupling assembly 152 and a ground connection assembly 154. Actuator coupling assembly includes a movement means 156 and connects first actuator 12 to second actuator 14 (shown in block form). Ground connection assembly 154 connects first and second actuators 12, 14, via actuator coupling assembly 152, to rigid support structure 36.

In the embodiment of FIG. 6, actuator coupling assembly 152 includes an endless belt 158, a first connector 160 and a second connector 162. It should be understood that endless belt 158 may be a cable, chain or other flexible structure. First connector 160 is secured to endless belt 158 and is configured to receive a portion of first actuator housing 18, such as tab 20 (FIG. 1). Second connector 162 is similarly connected to endless belt 158 opposite first connector 160. Second connector 162 is configured for attachment to a portion of second actuator housing 24, such as tab 26 (FIG. 1).

Movement means 156 preferably includes a pair of pulleys 164. As described in greater detail below, pulleys 164 are sized in accordance with a spacing between first and second actuators 12, 14 and are each rotatable about a central axis 166.

Ground connection means 154 is preferably a rod 168 configured to connect pulleys 164 to rigid support structure 36. While a single rod 168 is shown in FIG. 6, ground connection assembly 154 may alternatively include separate rods or anchors connecting each of pulleys 164 to rigid support structure 36. Regardless of exact form, rod 168 is configured such that each of pulleys 164 is rotatable about central axis 166, respectively.

During use, load transfer device 150 facilitates first and second actuators 12, 14 applying a torque load onto output shaft 28 (FIG. 1). For example, first and second actuators 12, 14 may receive a control signal calling for application of a clockwise torque. As first and second actuators 12, 14 operate to apply this torque, connection of first and second actuators 12, 14 to rigid support structure 36, via actuator coupling assembly 152 and ground connection assembly 154, provides a necessary resistance. With reference to the orientation of FIG. 6, with a clockwise torque application, both first and second actuator housings 18, 24 apply a downward force onto first and second connectors 160, 162, respectively. This force is transposed through actuator coupling assembly 152 and ground connection assembly 154 to rigid support structure 36 such that endless belt 158 does not move.

When moment loads produced by first and second actuators 12, 14 are unequal, load transfer device 150 facilitates a balancing of loads during a load transfer operation. For example, second actuator 14 may reach a mechanical stop point before first actuator 12. Under these circumstances, second actuator 14 resists further movement of output shaft 28 FIG. 1), whereas first actuator 12 continues to apply a torque. Assuming a clockwise torque is being applied by first actuator 12, second actuator 14 is essentially rigidly attached to output shaft 28. Second actuator housing 24 will begin to move upwardly relative to the orientation of FIG. 6. Load transfer device 150 allows for this movement as endless belt 158 moves about pulleys 164. In response to an upward movement of second actuator housing 24, load transfer device 150 causes first actuator 12 to move downwardly. As a result, moment load place on second actuator housing 24 is evenly distributed between first actuator 12 and second actuator 14. Once again, first and second actuator housings 18, 24 move in a reciprocal fashion.

Figure 7:
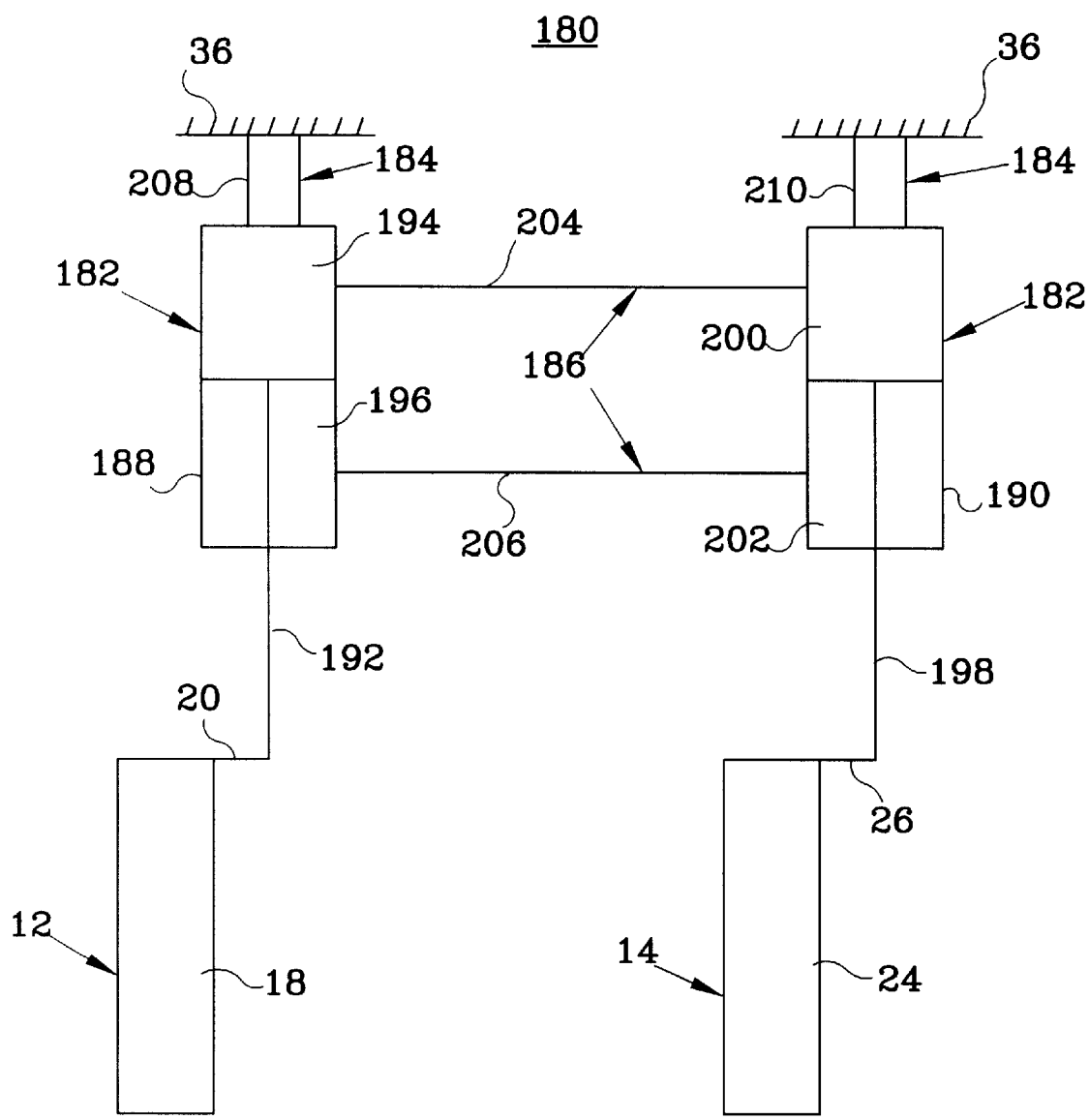
FIG. 7 is a block diagram of a fourth alternative load transfer device in accordance with the present invention.

Yet another alternative embodiment of a load transfer device 180 is shown in FIG. 7. Load transfer device 180 includes an actuator coupling assembly 182 and a ground connection assembly 184. Actuator coupling assembly 182 connects first actuator 12 to second actuator 14 and includes a movement means 186. Ground connection assembly 184 is associated with actuator coupling assembly 182 and connects first and second actuators 12, 14 to rigid support structure 36. As of previous embodiments, load transfer device 180 is configured to transfer a moment load from first actuator 12 to second actuator 14 during a load transfer operation.

In the embodiment of FIG. 7, actuator coupling assembly 182 includes a first hydraulic cylinder 188 and a second hydraulic cylinder 190. First hydraulic cylinder 188 includes a piston 192 configured for attachment to a portion of first actuator housing 18. Further, piston is sealed within first hydraulic cylinder 188 so as to define an inlet 194 and an outlet 196. Similarly, second hydraulic cylinder 190 includes a piston 198 configured for attachment to a portion of second actuator housing 24. Piston 198 is sealed within second hydraulic cylinder 190 so as to define an inlet 200 and an outlet 202.

Movement means 186 includes an inlet tube 204 and an outlet tube 206. As shown in FIG. 7, inlet tube 204 fluidly connects inlet 194 of first hydraulic cylinder 188 with inlet 200 of second hydraulic cylinder 190. Outlet tube 206 fluidly connects outlet 196 of first hydraulic cylinder 198 with outlet 202 of second hydraulic cylinder 190. By employing an incompressible fluid within hydraulic cylinders 188, 190, inlet and outlet tubes 204, 206 work in conjunction with hydraulic cylinders 188, 190 to control and drive positioning of pistons 192, 198. It should be understood that hydraulic cylinders 188, 190 are well known, rendering further details unnecessary.

Ground connection assembly 180 preferably includes a first anchor 208 and a second anchor 210. First and second anchors 208, 210 are preferably identical, each being configured to secure an associated hydraulic cylinder 188 or 190 with rigid support structure 36.

During use, load transfer device 180 facilitates normal operations of first and second actuators 12, 14. For example, in response to a control signal, first and second actuators 12, 14 are activated to apply a torque onto output shaft 28 (FIG. 1). In response to this generated moment load, first and second actuator housings 18, 24 apply substantially equal forces onto pistons 192, 198, respectively. Pistons 192, 198 are secured to first and second hydraulic cylinders 188, 190, respectively, which in turn are connected to rigid support structure 36 via first and second anchors 208, 210. Through this connection, sufficient resistance to movement of first and second actuator housings 18, 24 is provided such that first and second actuators 12, 14 will apply torque to output shaft 28. Notably, because forces generated by first and second actuator housings 18, 24 are substantially equal, pressure within first and second hydraulic cylinders 188, 190 is substantially equal such that pistons 192, 198 do not move.

Under certain situations, the moment load generated by first actuator 12 may differ from that of second actuator 14. For example, second actuator 14 may reach a mechanical stop point prior to first actuator 12. With this example, load transfer device 180 performs a load transfer operation by which the additional load on second actuator 14 is transferred or balanced with first actuator 12. More particularly, where second actuator 14 reaches a stop point, continued movement of first actuator 12 is transferred to second actuator 14 via output shaft 28 (FIG. 1). In response, second actuator 14, and in particular second actuator housing 24 moves with rotation of output shaft 28. Load transfer device 180 allows for this movement, whereby piston 198 moves upwardly (relative to the orientation of FIG. 7) toward inlet 200. Fluid within second hydraulic cylinder 190 is forced from inlet 200 through inlet tube 204 to inlet 194 of first hydraulic cylinder 188. This additional fluid within first hydraulic cylinder 188 acts upon piston 192, forcing piston 192 downwardly (relative to the orientation of FIG. 7). In this regard, fluid is forced from outlet 196 of first hydraulic cylinder 188 through outlet tube 206 into outlet 202 of second hydraulic cylinder 190. Thus, in response to a forced movement of piston 198, piston 192 is forced through a reciprocal movement which in turn is imparted on first actuator housing 18. In summary, then, an excess load on second actuator 14 is transferred, via load transfer device 180, to first actuator housing 18. Effectively, then, loads on first and second actuators 12, 14 are balanced.

The load transfer device of the present invention provides for long term operation of tandem mounted actuators with minimal wear. The load transfer device of the present invention facilitates normal operation of tandem mounted actuators by connecting each actuator to a rigid support structure, such as duct work associated with a valve or damper being controlled. Additionally, a load transfer device incorporating an actuator coupling assembly as described herein will evenly distribute unequal loads generated by or placed upon the actuators during use. To this end, the load transfer device facilitates slight movement of one actuator housing relative to the other actuator housing during a load transfer operation. More particularly, the load transfer device is designed to allow for movement of one actuator housing and transpose that movement into a forced, reciprocal movement of the other actuator housing.

Although the present invention has been described with reference to preferred embodiments, workers skilled in the art will recognize that changes may be made in form and detail without departing from the spirit and scope of the present invention. For example, the load transfer device of the present invention has been shown as preferably coupling two actuators mounted to the same output shaft. Alternatively, the load transfer device may connect two actuators connected to different output shafts. Additionally, five different embodiments of a load transfer device have been described herein. It should be understood, however, that the load transfer device may assume a wide variety of other forms. For example, for embodiments in which a single connecting piece has been shown (e.g., a single beam or linkage), multiple connections may instead be used.

What is claimed is:

1. Rotary shaft driver apparatus in which a shaft is simultaneously driven by first and second actuators, the rotary shaft driver apparatus including a mechanism for splitting the actuator load between the first and second actuators, comprising:

a support structure;

an output shaft mounted for rotation relative to said support structure about a first axis with which said output shaft is aligned;

a first actuator having first and second members which, upon energization, are rotated in opposite directions relative to one another, the first member of said first actuator being coupled to said output shaft for imparting rotation thereto;

a second actuator having first and second members which, upon energization, are rotated in opposite directions relative to one another, the first member of said second actuator being coupled to said output shaft for imparting rotation thereto; and a coupling mechanism coupling the second members of said first and second actuators to one another at first and second spaced apart locations and to said support structure at a third location between the first and second spaced apart locations, whereby said mechanism permits limited counter-rotational movement between the second members of said first and second actuators, while precluding simultaneous rotation of the second members of said first and second actuators in the same direction relative to said support structure.

2. The rotary shaft driver apparatus of claim 1 wherein said coupling mechanism includes a beam pivotally coupled to the second members of said first and second actuators at the first and second locations respectively, and coupled to the support structure at the third location for pivotal movement about a second axis transverse to the first axis.

3. The rotary shaft driver apparatus of claim 2 wherein said beam is pivotally coupled to the second members of said first and second actuators at first and second spaced apart locations by means of first and second bits on the second members of said first and second actuators which capture opposite ends of said beam.

4. The rotary shaft driver apparatus of claim 1 wherein said coupling mechanism comprises:

first and second motion translation members pivotable about third and fourth substantially parallel axes spaced from one another and from the first axis, the third and fourth axes being fixed relative to said support structure;

first and second connecting devices pivotally coupling the second members of said first and second actuators to said first and second motion translation members respectively at locations thereon spaced from the third and fourth axes respectively; and a link pivotally coupled at first and second ends thereof to second locations on said first and second motion translation members respectively, the second location on said first motion translation member being offset from a straight line extending through the third axis and the point of pivotal coupling with the second member of said first actuator, the second location on said second motion translation member being offset from a straight line extending through the fourth axis and the point of pivotal coupling with the second member of said second actuator.

5. The rotary shaft driver apparatus of claim 1 wherein said coupling mechanism comprises:

a pinion mounted on said support structure for rotation relative thereto; and first and second racks fixed to the second members of said first and second actuators respectively, said first and second racks being configured and positioned so that gear teeth thereon engage substantially diametrically opposite gear teeth on said pinion.

6. The rotary shaft driver apparatus of claim 1 wherein said coupling mechanism comprises:

a pair of idler wheels each mounted on said support structure for rotation relative thereto about parallel axes of rotation;

a flexible loop extending around said first and second idler wheels; and means coupling the second members of said first and second actuators to said flexible loop at first and second locations on opposite sides of a line joining the axes of rotation of said first and second idler wheels.

7. The rotary shaft driver apparatus of claim 1 wherein said coupling mechanism comprises:

a first fluid transfer member including a first housing with cylindrical cavity therein separated into first and second chambers by a first moveable piston, one of the first housing and the first piston being connected to said support structure, and the other of the first housing and the first piston being pivotally connected to the second member of said first actuator;

a second fluid transfer device including a second housing with cylindrical cavity therein separated into first and second chambers by a second moveable piston, one of the second housing and the second piston being connected to the support structure, and the other of the second housing and the second piston being pivotally connected to the second member of said second actuator;

a first fluid passageway interconnecting the first chambers of the first and second fluid transfer devices; and a second fluid passageway interconnecting the second chambers of the first and second fluid transfer devices, whereby movement of one of the first and second pistons in one direction within its associated housing forces movement of the other of the first and second pistons in the opposite direction within its associated housing, so as to permit rotation of the second members of said first and second actuators only in opposite directions relative to one another and only simultaneously in opposite directions relative to said support structure.

* * * * *